United States Patent
Marti et al.

(10) Patent No.: US 9,532,184 B2
(45) Date of Patent: Dec. 27, 2016

(54) SURVEY TECHNIQUES FOR GENERATING LOCATION FINGERPRINT DATA

(71) Applicant: Apple Inc., Cupertino, CA (US)

(72) Inventors: Lukas M. Marti, Santa Clara, CA (US); Robert Mayor, Half Moon Bay, CA (US); Shannon M. Ma, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/868,732

(22) Filed: Sep. 29, 2015

(65) Prior Publication Data

US 2016/0021514 A1 Jan. 21, 2016

Related U.S. Application Data

(62) Division of application No. 13/756,458, filed on Jan. 31, 2013, now Pat. No. 9,198,003.

(51) Int. Cl.
| | |
|---|---|
| *H04W 4/00* | (2009.01) |
| *H04W 24/00* | (2009.01) |
| *H04W 4/04* | (2009.01) |
| *G01S 5/02* | (2010.01) |
| *G06F 3/048* | (2013.01) |

(Continued)

(52) U.S. Cl.
CPC .............. *H04W 4/04* (2013.01); *G01C 21/206* (2013.01); *G01S 5/0252* (2013.01); *G06F 3/048* (2013.01); *H04M 1/00* (2013.01); *H04W 48/16* (2013.01); *H04W 88/02* (2013.01); *H04W 88/08* (2013.01)

(58) Field of Classification Search
None
See application file for complete search history.

(56) References Cited

U.S. PATENT DOCUMENTS

| | | | |
|---|---|---|---|
| 7,397,424 | B2 | 7/2008 | Houri |
| 7,856,234 | B2 | 12/2010 | Alizadeh-Shabdiz et al. |

(Continued)

FOREIGN PATENT DOCUMENTS

| | | |
|---|---|---|
| CA | 2 725 250 | 6/2012 |
| CA | 2725250 | 6/2012 |

(Continued)

OTHER PUBLICATIONS

International Search Report and Written Opinion of the International Searching Authority, PCT Application Serial No. PCT/US2014/011906, Apr. 9, 2014, 17 pp.

(Continued)

*Primary Examiner* — Erika Washington
(74) *Attorney, Agent, or Firm* — Fish & Richardson P.C.

(57) ABSTRACT

Surveying techniques for generating location fingerprint data are described. A mobile device can survey a venue by measuring, at multiple locations at the venue, signals from one or more signal sources. At each location, the mobile device can take multiple measurements of signals. The mobile device can take each measurement at a distinct orientation. The measurements can be used to determine expected measurements of the signals at the venue. Differences between the multiple measurements of signals can be used to determine a variance of the expected measurements. The expected measurements and variance can be designated as location fingerprint data for the venue. The location fingerprint data can be used by mobile devices for determining a location at the venue.

20 Claims, 11 Drawing Sheets

(51) Int. Cl.
  *H04M 1/00* (2006.01)
  *G01C 21/20* (2006.01)
  *H04W 48/16* (2009.01)
  *H04W 88/02* (2009.01)
  *H04W 88/08* (2009.01)

(56) References Cited

U.S. PATENT DOCUMENTS

| | | |
|---|---|---|
| 7,899,583 B2 | 3/2011 | Mendelson |
| 7,924,149 B2 | 4/2011 | Mendelson |
| 8,030,914 B2 | 10/2011 | Alameh et al. |
| 8,054,219 B2 | 11/2011 | Alizadeh-Shabdiz |
| 8,223,074 B2 | 7/2012 | Alizadeh-Shabdiz |
| 8,369,264 B2 | 2/2013 | Brachet et al. |
| 8,478,297 B2 | 7/2013 | Morgan et al. |
| 8,836,580 B2 | 9/2014 | Mendelson |
| 8,866,673 B2 | 10/2014 | Mendelson |
| 8,896,485 B2 | 11/2014 | Mendelson |
| 8,941,485 B1 | 1/2015 | Mendelson |
| 8,983,493 B2 | 3/2015 | Brachet et al. |
| 9,020,687 B2 | 4/2015 | Mendelson |
| 9,198,003 B2 | 11/2015 | Marti et al. |
| 9,204,251 B1 | 12/2015 | Mendelson |
| 9,204,257 B1 | 12/2015 | Mendelson |
| 2005/0130677 A1 | 6/2005 | Meunier et al. |
| 2007/0202888 A1 | 8/2007 | Brachet et al. |
| 2010/0109842 A1 | 5/2010 | Patel et al. |
| 2010/0277363 A1 | 11/2010 | Kainulainen et al. |
| 2011/0281532 A1 | 11/2011 | Shin et al. |
| 2012/0064855 A1 | 3/2012 | Mendelson |
| 2013/0217418 A1 | 8/2013 | Maurin et al. |
| 2014/0011518 A1 | 1/2014 | Valaee et al. |
| 2014/0213299 A1 | 7/2014 | Marti et al. |

FOREIGN PATENT DOCUMENTS

| | | |
|---|---|---|
| CN | 1920593 | 2/2007 |
| CN | 101547506 | 9/2009 |
| EP | 1 542 492 | 6/2005 |

OTHER PUBLICATIONS

Chinese Office Action in Application No. 201480006897.7, dated Jun. 30, 2016, 21 pages (with English Translation).

SURVEY TECHNIQUES FOR GENERATING LOCATION FINGERPRINT DATA

CROSS-REFERENCE TO RELATED APPLICATION

This application is a divisional of and claims priority to U.S. patent application Ser. No. 13/756,458, filed Jan. 31, 2013, the entire contents of which are incorporated herein by reference.

TECHNICAL FIELD

This disclosure relates generally to location determination.

BACKGROUND

Some mobile devices have features for determining a geographic location. For example, a mobile device can include a receiver for receiving signals from a global satellite system (e.g., global positioning system or GPS). The mobile device can determine a geographic location, including latitude and longitude, using the received GPS signals. In many places, GPS signals can be non-existent, weak, or subject to interference, such that it is not possible to accurately determine a location using the GPS functions of the mobile device. For example, a conventional mobile device often fails to determine a location based on GPS signals when the device is inside a building or tunnel.

SUMMARY

Surveying techniques for generating location fingerprint data are described. A mobile device can survey a venue by measuring, at multiple locations at the venue, signals from one or more signal sources. At each location, the mobile device can take multiple measurements of signals. The mobile device can take each measurement at a distinct orientation. The measurements can be used to determine expected measurements of the signals at the venue. Differences between the multiple measurements of signals can be used to determine a variance of the expected measurements. The expected measurements and variance can be designated as location fingerprint data for the venue. The location fingerprint data can be used by mobile devices for determining a location at the venue when GPS signals are unavailable.

In general, in one aspect, a mobile device surveying a venue can move along a path from a starting point at the venue to an ending point at the venue in a first pass. While the mobile device moves, the mobile device can scan for signals and record measurements of the signals. Upon reaching the ending point, the mobile device can move from the ending point back to the starting point along the path in a second pass, while scanning for signals and recording measurements. The mobile device can determine estimated measurements at multiple locations along the path. For each of the locations, the mobile device can determine difference between a measurement recorded in the first pass and a measurement recorded in the second pass. The mobile device can use the difference to determine a variance of expected measurements at the corresponding location at the venue.

The features described in this specification can be implemented to achieve the following advantages. Compared to conventional techniques for generating location fingerprint data, the surveying techniques described in this specification can provide higher quality data for determining the location fingerprints. In surveying a venue to generate location fingerprint data, random factors, e.g., orientations of the surveying device or orientations of a body of a human holding the surveying device, can affect accuracy of signal measurements. A human body can attenuate a signal (e.g., a radio frequency (RF) signal). By measuring the signals in multiple orientations, a device determining the location fingerprint data can reduce the effect of randomness a surveyor may inadvertently introduce. The location fingerprint data can have better quality, and more effective when used by a mobile device to determine a location at the venue.

The details of one or more implementations of surveying techniques are set forth in the accompanying drawings and the description below. Other features, aspects, and advantages of the surveying techniques will become apparent from the description, the drawings, and the claims.

BRIEF DESCRIPTION OF THE DRAWINGS

Like reference symbols in the various drawings indicate like elements.

DETAILED DESCRIPTION

Exemplary Still Survey

Figure 1:
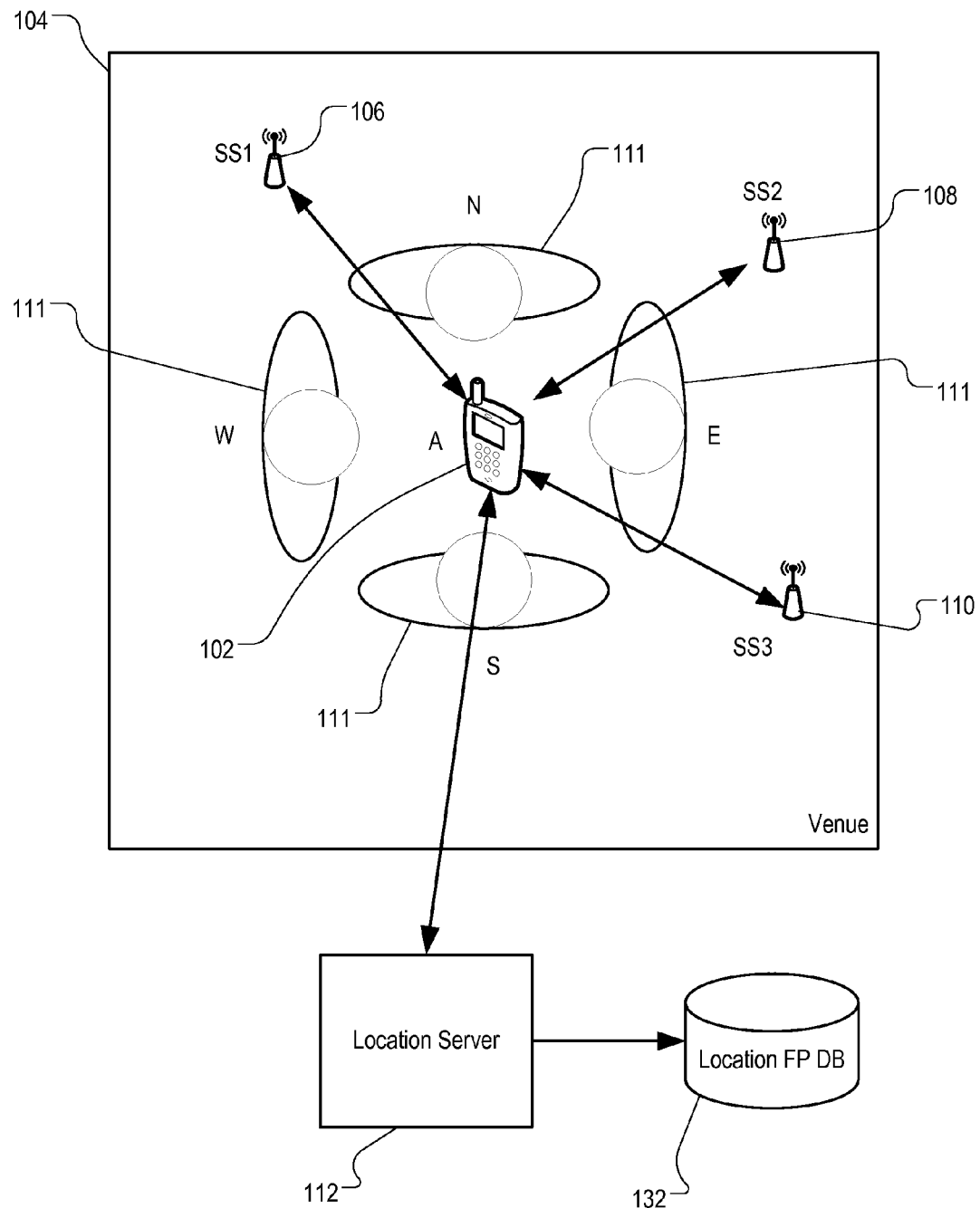
FIG. 1 is a diagram illustrating exemplary still survey techniques.

FIG. 1 is a diagram illustrating exemplary still survey techniques. Mobile device 102 can be a device implementing features of still survey. Mobile device 102 can be located at venue 104, and be programmed to survey venue 104 for populating a location fingerprint database.

Venue 104 can be a space accessible by a pedestrian. Venue 104 can include one or more constraints limiting the pedestrian's movement in the space. These constraints can include, for example, map constraints (e.g., walls, railings, or cubicle separators), pathway constraints (e.g., a pedestrian walking on a pathway defined by road signs tends to follow the pathway), or pedestrian motion constraints (e.g., a pedestrian cannot move faster than X miles per hour, or move vertically when not in a stairway or elevator). Venue 104 can be a physical structure. The physical structure can be closed (e.g., an office building) or open (e.g., an open stadium). The space can be indoor space inside of the physical structure, or space inside of a bounding space of the physical structure if the physical structure is open. Venue 104 can be mobile (e.g., an airplane, a cruise ship, or a mobile oil platform).

Surveying venue 104 can include measuring signals from signal sources (e.g., signal sources 106, 108, and 110) at various locations (e.g., location A) at venue 104. Each of signal sources 106, 108, and 110 can include a radio frequency (RF) signal transmitter, e.g., a wireless access point. Measuring the signals from signal sources 106, 108, and 110 can include performing a channel scan at location A in multiple orientations to compensate attenuation of the signals by surveyor 111. The channel scan can be a scan of all standard RF channels of signal sources 106, 108, and 110. Surveyor 111 can be a pedestrian carrying mobile device 102. A pedestrian can be a human, or a device, that moves at a speed similar to walking speed of a human. If a signal is detected in a channel scan, mobile device 102 can measure one or more aspects of the signal. For example, mobile device 102 can measure a received signal strength indication (RSSI) or a round trip time or both. Mobile device 102 can record the measurements in association with an identifier of each of signal sources 106, 108, and 110. The identifier can be a media access control (MAC) address or a service set identification (SSID) of the respective signal source.

Mobile device 102 can take measurements at an east orientation, where surveyor 111 is located east of mobile device 102, and at a south orientation, a west orientation, and a north orientation, where surveyor 111 is located at corresponding locations relative to mobile device 102. In some implementations, the east, south, west, and north orientations can be relative to Earth. In some implementations, the east, south, west, and north orientations can be relative to venue 104. In some implementations, the east, south, west, and north orientations can be arbitrary orientations, as long as the east and west are perpendicular to the north and south.

In FIG. 1, surveyor 111 changes a location of surveyor 111 to east, south, west, and north of location A, where mobile device 102 is constantly located during the measurements. In various implementations, surveyor 111 can remain at a constant location, or remain "still" at a location (e.g., location A) and turn east, south, west, and north, and cause mobile device 102 to take measurements when surveyor 111 faces each direction.

Mobile device 102 can submit the recorded measurements as survey data to location server 112. Location server 112 can include one or more computers programmed to generate location fingerprint data based on the received survey data. The location fingerprint data can include location fingerprints for multiple locations at the venue. A location fingerprint can include expected measurements of signals from signal sources 106, 108, and 110 at the corresponding location, variance of the expected measurements, and weights of the expected measurements. Location server 112 can determine the expected measurements at location A based on the measurements received from mobile device 102. Location server 112 can determine the variance based at least in part on differences between the measurements taken at the east, south, west, and north orientations. Location server 112 can determine the location fingerprints for locations not surveyed by mobile device 102 through interpolation. Location server 112 can store the location fingerprint data in location fingerprint database 132. When another mobile device enters venue 104, location server 112 can provide the location fingerprint data to that mobile device for determining a location of that mobile device relative to venue 104.

Figure 2:
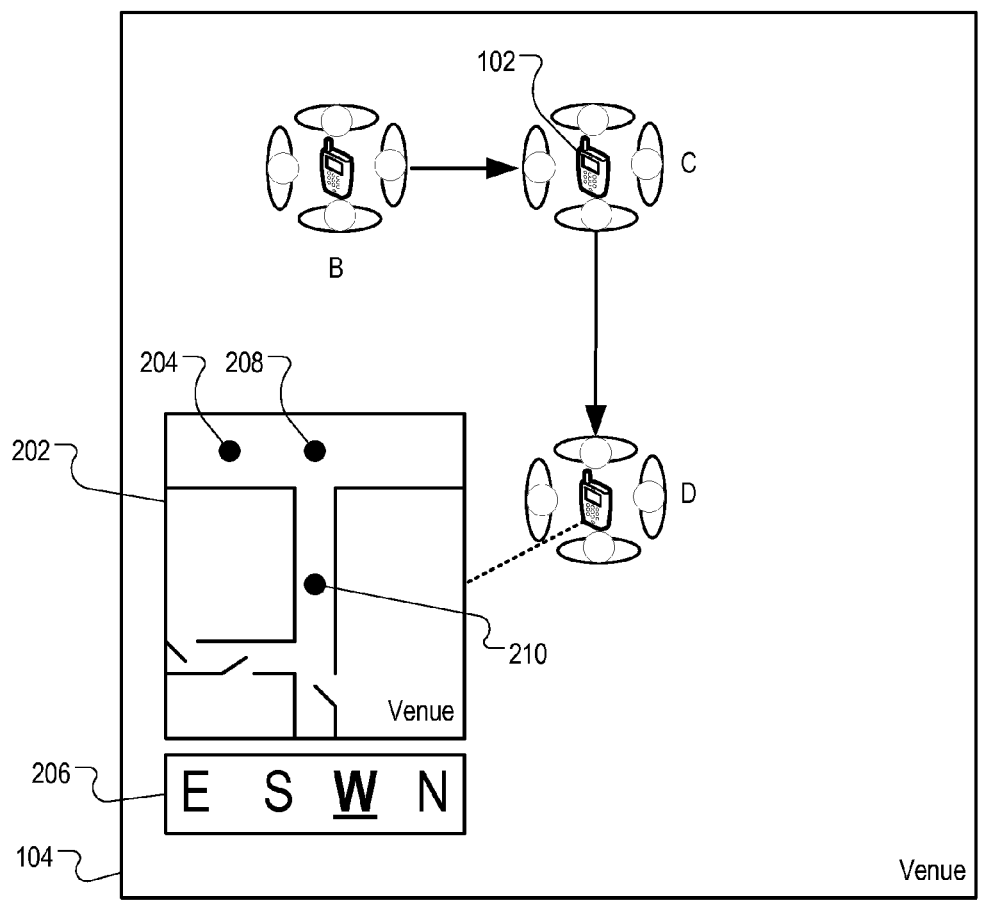
FIG. 2 is a diagram illustrating exemplary techniques of still survey at multiple locations.

FIG. 2 is a diagram illustrating exemplary techniques of still survey at multiple locations. Mobile device 102 can survey venue 104 at multiple locations, e.g., locations B, C, and D. While surveying venue 104, mobile device 102 can provide for display venue map 202. Venue map 202 can be a map showing interior structures of venue 104 or other constraints of movements at venue 104.

Venue map 202 can be configured to receive an input, e.g., a touch input, selecting a location, e.g., location 204. When a surveyor carrying mobile device 102 is located at location B, the surveyor can touch or otherwise select location 204 that corresponds to location B. Upon receiving the input, location 204 can be represented using a marker (e.g., a dot as shown in FIG. 2).

Upon receiving the input, mobile device 102 can provide for display orientation user interface 206. Orientation user interface 206 can include a prompt for each orientation, e.g., east, south, west, and north. Each prompt can receive an input (e.g., a touch input). Upon receiving the input, mobile device 102 can record, in association with the corresponding orientation, measurements of signals received. When measurements are recorded for a given orientation, e.g., west, the prompt for the orientation can be highlighted or otherwise emphasized. Mobile device 102 can hide orientation user interface 206 when measurements are recorded for each orientation. In some implementations, mobile device 102 can use a sensor (e.g., a compass coupled to mobile device 102) to determine the orientations automatically. Mobile device 102 can highlight each orientation on orientation user interface 206 when mobile device 102 determines that a measurement has been taken at the corresponding orientation without requesting a user to select that orientation.

Mobile device 102, being carried by the surveyor, can then move to location C and then location D. At each of locations C and D, mobile device 102 can receive selection inputs through orientation interface 206 and record measurements for each orientation. In some implementations, each location where mobile device 102 has recorded measurements can be represented in venue map 202, e.g., as markers at location 204, location 208, and location 210. Upon completion of surveying, or while surveying is ongoing, mobile device 102 can submit the recorded measurements to a location server (e.g., location server 112 of FIG. 1).

Exemplary Walking Survey

Figure 3:
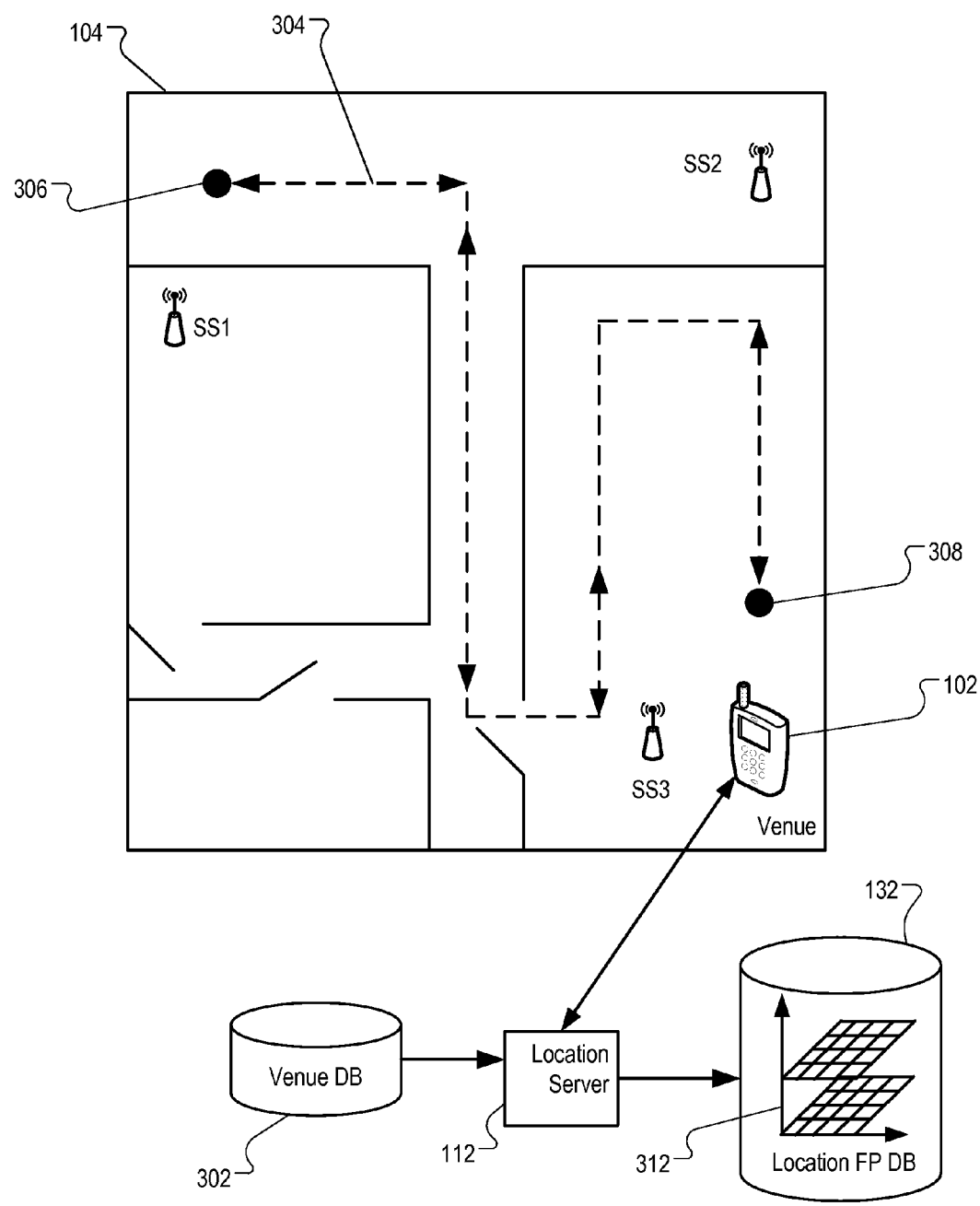
FIG. 3 is a diagram illustrating exemplary walking survey techniques.

FIG. 3 is a diagram illustrating exemplary walking survey techniques. Mobile device 102 can be programmed to survey venue 104. Location server 112 can provide a venue map to mobile device 102. The venue map can be stored in venue database 302.

The venue map can be associated with survey path 304. Survey path 304 can be a path that mobile device 102 is to travel at venue 104. In some implementations, location server 112 provides survey path 304 to mobile device 102 in association with the venue map. In some implementations, mobile device 102 can determine survey path 304, for example, based on a path drawn on the venue map by a surveyor. Survey path 304 can be displayed overlaying on the venue map.

Survey path 304 can have starting point 306 and ending point 308. Starting point 306 and ending point 308 can each be represented as a marker. Each marker can receive a selection input upon which measurement will begin or end. For example, at starting point 306, mobile device 102 can receive a first input (e.g., a touch input selecting starting point 306). Mobile device 102 can then be carried by a surveyor to move along survey path 304 to ending point 308, while the surveyor walks. While moving, mobile device 102 can record measurements of signal from signal sources. When the signal sources are wireless access points, recording the measurements can include performing a scan on frequency channels of the wireless access points. In some implementations, the scan can be performed on preferred channels. The preferred channels can be non-overlapping channels, e.g., channels 1, 6, and 11 in a 802.11b/g wireless network. The scan can be performed back to back, e.g., consecutively and repeatedly. Each scan can be configured to last longer than a beacon interval of the signal source. For example, when the beacon interval between beacon transmissions is 100 milliseconds, each scan can be configured to last 110 milliseconds or longer. Mobile device 102 can perform the scans without surveyor intervention.

Mobile device 102 can receive a second input (e.g., a touch input selecting ending point 308) when mobile device 102 reaches ending point 308. Mobile device 102 can use a length of survey path 304 and a time interval between the first input and the second input to determine a velocity of movement of mobile device 102. Based on the velocity, mobile device 102 can determine locations on survey path 304 where mobile device 102 recorded the measurements, and associate the locations with the corresponding measurements.

Upon receiving the second input, mobile device 102 can provide a prompt to the surveyor instructing the surveyor to walk back to starting point 306. Mobile device 102 can continue recording the measurements until mobile device 102 returns to starting point 306, where mobile device 102 can receive a third input for stopping the recording. Mobile device 102 can match locations where mobile device 102 recorded the measurements on the way back with locations where mobile device 102 previous recorded measurements. A variance of expected measurements can be determined based on the differences. Mobile device 102 can submit the measurements and the locations to a location server for generating location fingerprint data 312 for storing in location fingerprint database 132.

Figure 4:
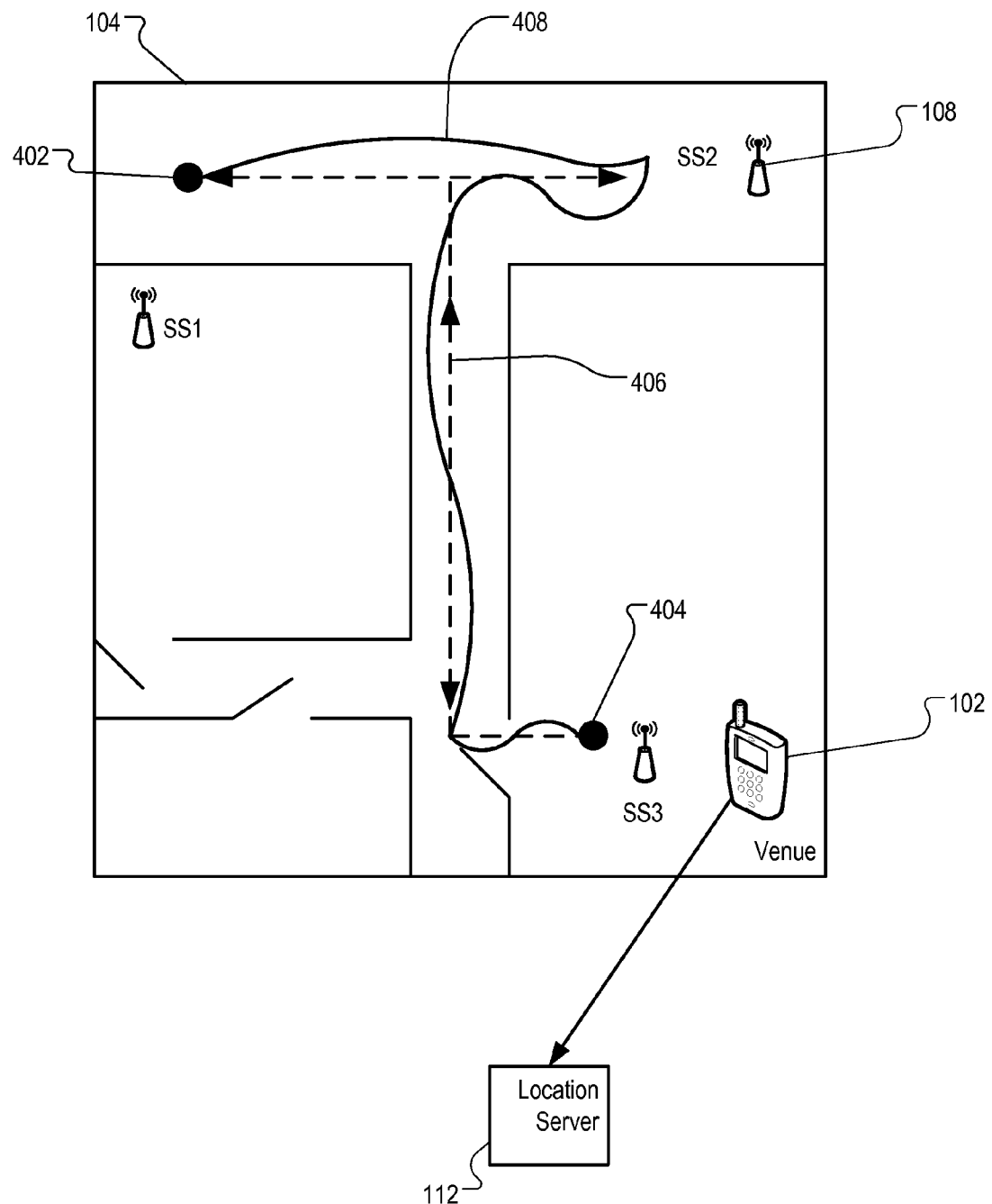
FIG. 4 is a diagram illustrating exemplary techniques of walking survey following a path defined by a starting point and an ending point.

FIG. 4 is a diagram illustrating exemplary techniques of walking survey following a path defined by a starting point and an ending point. Mobile device 102 surveying venue 104 can provide for display a venue map of venue 104. The venue map can be configured to receive a first input designating location 402 as a starting point, and a second input designating location 404 as an ending point. Mobile device 102 can determine survey path 406 based on location 402 and location 404 and readings of one or more sensors of mobile device 102.

The sensors can include, for example, one or more of a compass, an accelerometer, a gyroscope, a barometer, or other sensors that can detect motion directly or indirectly. Based on readings of these sensors, mobile device 102 can determine a heading and a speed of mobile device 102. For example, mobile device 102 can determine a pace and a speed of walking of a surveyor based on periodic acceleration and deceleration. Mobile device 102 can detect a change of direction based on compass and gyroscope readings. Mobile device 102 can detect a movement between floors based on barometer readings. Based on the heading and speed, location 402, which is the starting point, and one or more constraints of venue 104 (e.g., walls and hallways), mobile device 102 can determine survey path 406.

In some implementations, mobile device 102 can determine survey path 406 based on truth data. Truth data can include known locations of signal sources, e.g., signal source 108. Mobile device 102 can determine, based on a reading of a receiver, that a signal from signal source 108 has an attribute that satisfies a closeness threshold (e.g., an RSSI exceeding X dB). Accordingly, mobile device 102 can determine that the mobile device 102 has a high probability of being located proximate to the location of signal source 108. Mobile device 102 can verify the location of mobile device 102 as determined based on the sensor readings using the probability.

Survey path 406 can be an approximation of actual path 408 along which mobile device 102 travels at venue 104. Mobile device 102 can move to location 404 corresponding to the ending point, and move back to location 402 corresponding to the starting point. During or after the survey, mobile device 102 can submit the recording of measurements as survey data to location server 112.

Exemplary Surveying Device

Figure 5:
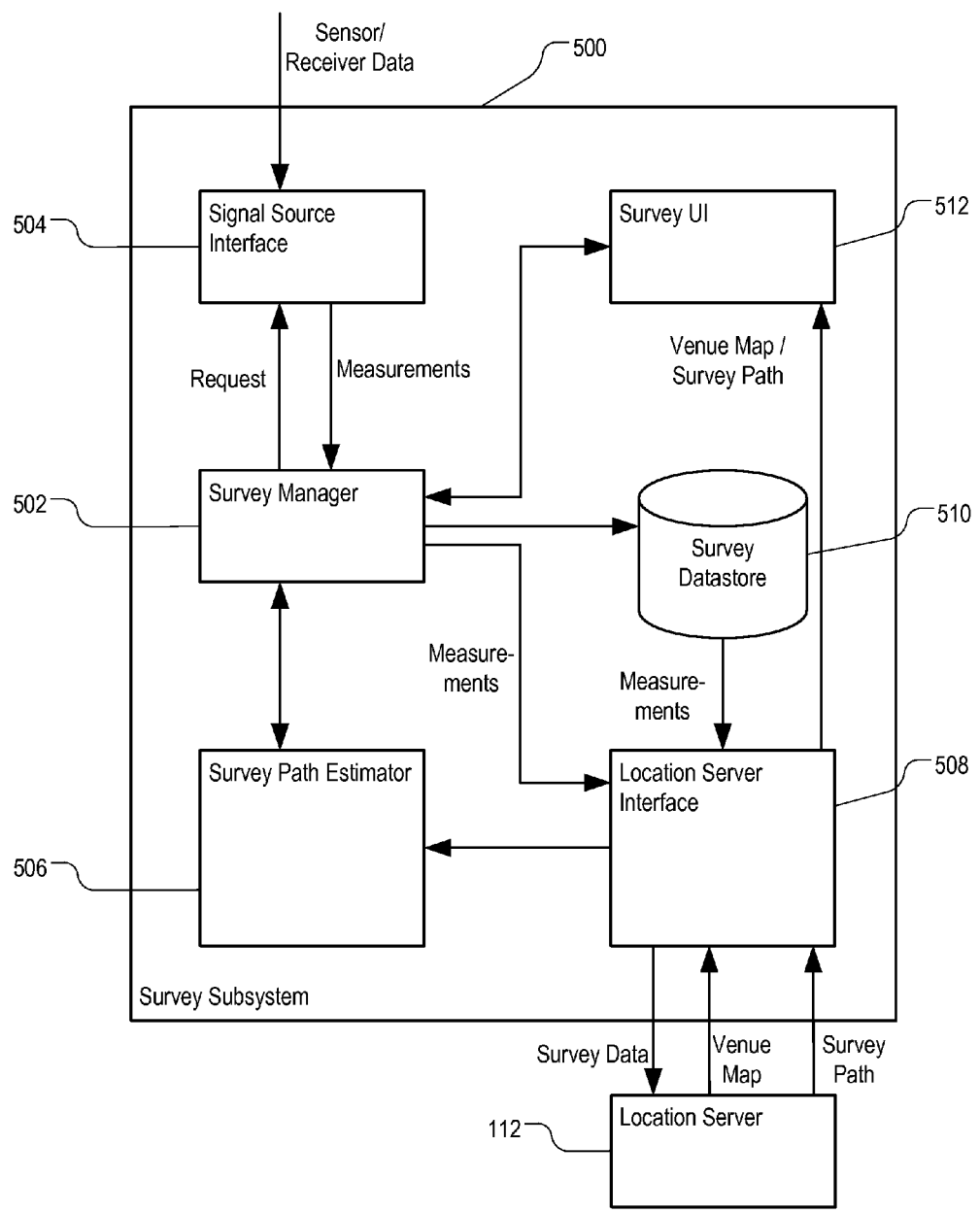
FIG. 5 is a block diagram illustrating components of an exemplary location survey subsystem of a mobile device.

FIG. 5 is a block diagram illustrating components of exemplary survey subsystem 500 of mobile device 102. Survey subsystem 500 can include hardware or software components for conducting location surveys for populating a location fingerprint database.

Survey subsystem 500 can include survey manager 502. Survey manager 502 is a component of survey subsystem 500 configured to manage location surveying functions. Survey manager 502 can provide rules for scanning channels, recording measurements, determining locations at which measurements are recorded, and managing measurement data. Survey manager 502 can receive measurement data from signal source interface 504.

Signal source interface 504 is a component of survey subsystem 500 configured to interface with the one or more sensors or receivers of mobile device 102 and provide measurements of the signals and identifiers of the signal sources to survey manager 502. The measurements can include, for example, an RSSI or a round-trip time when signal sources 106, 108, and 110 are wireless access points, a temperature when signal sources 106, 108, and 110 are heat sources, a sound pressure level when signal sources 106, 108, and 110 are sound sources, a light intensity or spectrum when signal sources 106, 108, and 110 are light sources. In addition, signal source interface 504 can provide micro-electro-mechanical systems (MEMS) data to survey manager 502. Survey manager 502 can associate the measurements with locations at a venue based on survey path data received from survey path estimator 506.

Survey manager 502 can receive location path data from survey path estimator 506. Survey path estimator 506 is a component of survey subsystem 500 configured to determine a survey of mobile device 102. Survey path estimator 506 can determine the survey path based on starting points and ending points provided by survey manager 502, and a venue map provided by location server interface 508. Survey path estimator 506 can provide the survey path to survey manager 502, which, in turn, can use the survey path and MEMS data to determine locations associated with the measurements.

Location server interface 508 is a component of survey subsystem 500 configured to receive venue map and, in some implementations, survey path from location server 112. Upon receiving the venue map and survey path, location server interface 508 can submit the venue map and survey path (if any) to survey path estimator 506. If survey path is submitted to survey path estimator 506, survey path estimator 506 can provide the survey path to survey manager 502.

Survey manager 502 can associate measurements received from signal source interface 504 with locations determined based on the survey path data. Survey manager 502 can designate the result as survey data, and provide the survey data to location server interface 508 for submitting to a location server. In some implementations, survey manager 502 can store the survey data in survey data store 510, for submit to the location server later.

Survey subsystem 500 can include survey user interface 512. Survey user interface 512 can provide a venue map (received from location server interface 508) for display on mobile device 102. Survey user interface 512 can provide for display a survey path overlaying on the venue map. Survey user interface 512 can provide various user interface items for receiving user input for designating starting and ending points, locations of measurements, and orientations of measurements.

Exemplary Location Fingerprint Data

Figure 6:
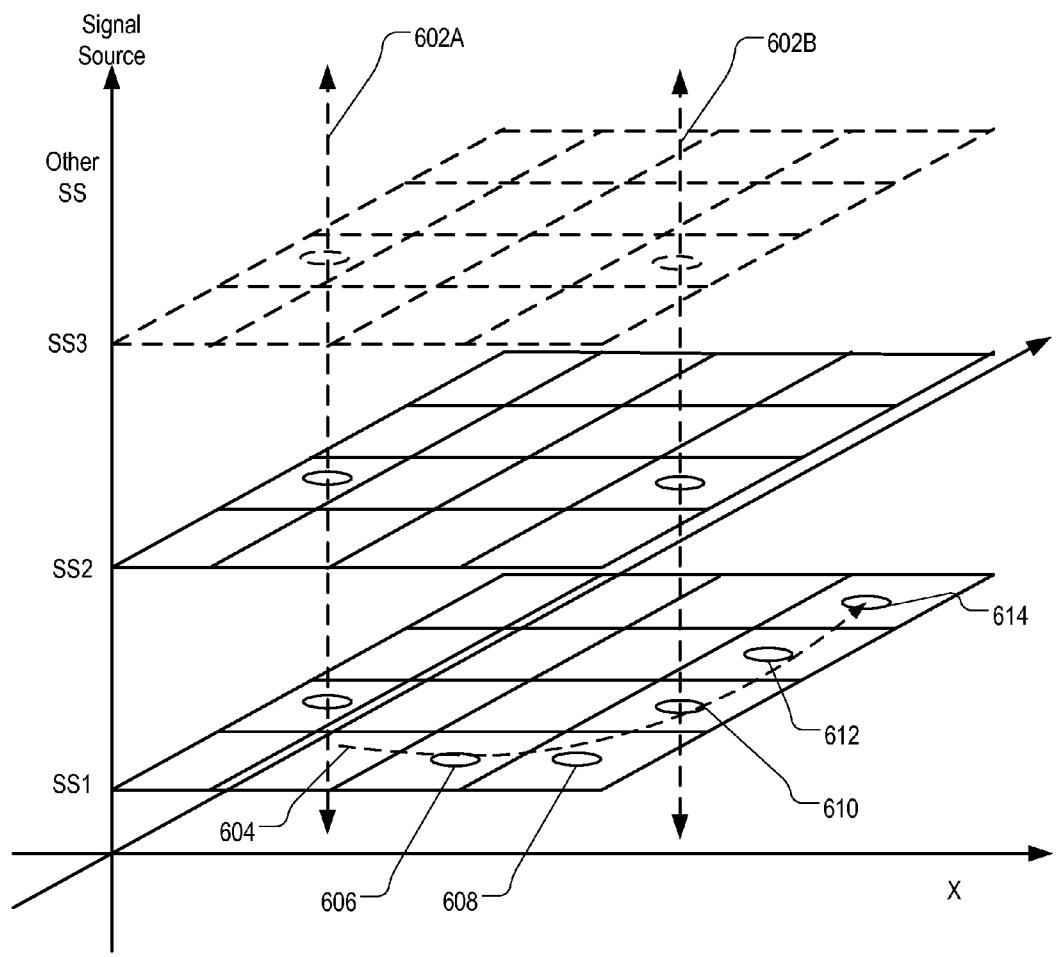
FIG. 6 illustrates an exemplary logical structure of a location fingerprint database.

FIG. 6 illustrates an exemplary logical structure of location fingerprint data. The location fingerprint data can be generated by location server 112, and stored in location fingerprint database 132. The exemplary logical structure illustrated in FIG. 3 can correspond to a portion of the location fingerprint database, e.g., the portion that corresponds to venue 104.

Location fingerprint data can include, for each location among multiple locations in a venue (e.g., venue 104 of FIG. 1), a measurement vector. A measurement vector can include expected measurements of the signal sources at the location, variance of the expected measurements, and weights of the expected measurements at the location. The expected measurements can include measurements that a mobile device, if located at the corresponding location, is expected to see. The variance can include a range of values of the expected measurements, and a probability that the measurements have each value. The weights can indicate how much weight the mobile device is going to apply to the corresponding expected measurements in statistical classification. The weight of a given signal source can correspond to a probability that a mobile device can detect the signal from the signal source.

The expected measurements can correspond to more than one type of signal sources. For example, location fingerprint data can include at least one of: wireless access point fingerprint data; radio frequency identification (RFID) fingerprint data; near field communication (NFC) fingerprint data; Bluetooth™ fingerprint data; magnetic field fingerprint data; cellular fingerprint data; or computer vision fingerprint data. The various fingerprint data can be aggregated to form the location fingerprint data for a given venue or a given location at the venue. The various fingerprint data can include, for example, a received signal strength indication (RSSI), a round trip time, a magnetic field strength and direction.

Location fingerprint data can be stored as multi-dimensional data in association with a venue. Some of the dimensions of the multi-dimensional data can be space dimensions. The space dimensions can include X (e.g., latitude), Y (e.g., longitude), and Z (e.g., altitude, not shown). The space dimension can be continuous, expressed in a function, or discrete, where the space dimension can include locations distributed in the venue. The distribution can be even and uniform, or concentrated around areas where good measurements (e.g., strong signals or strong contrast between a first signal and a second signal) exist.

At least one dimension of the multi-dimensional data can be a signal source dimension. Location fingerprint data can include multiple measurement vectors, each measurement vector corresponding to a location in the venue. Measurement vector 602A can correspond to a location represented by (X1, Y1, Z1), and have one or more values of each signal source at location (X1, Y1, Z1). Likewise, measurement vector 602B can correspond to a location represented by (X2, Y2, Z2), and have one or more values of each signal source at location (X2, Y2, Z2). The values can include one or more of an expected value of an environment variable (e.g., an expected RSSI), a variance of the expected value, or the weight. Location server 112 can determine the expected measurement and variance based on measurements and variance of the measurements received from a sampling device. The sampling device can be a mobile device configured to detect signals from signal sources at multiple locations in the venue when the mobile device moves in the venue.

In some implementations, the space dimension can be normalized. Each measurement received from a mobile device can correspond to a sampling point. For example, a surveyor can carry the mobile device and follow survey path 604 to survey a venue. Location server 112 can determine a location grid, and normalize survey path 604 to locations 606, 608 610, 612, and 614 according to distribution of locations 606, 608 610, 612, and 614.

Location server 112 can determine the location fingerprint data based on measurements received from mobile device 102. Determining the location fingerprint data can include interpolating the received measurements to determine a measurement vector for a location not surveyed by mobile device 102. Determining the location fingerprint data can include determining the variance based on differences between the measurements recorded at different orientations. Determining the location fingerprint data can include determining the variance based on differences between measurements at a location of a survey path recorded while mobile device 102 moves to an ending point and measurements at the same location of a survey path recorded while mobile device 102 moves to a starting point. The variance can be higher when the differences are higher. In some implementations, the location fingerprint data can be determined by survey manager 502 of mobile device 102 and provided to location server 112.

Exemplary Procedures

Figure 7:
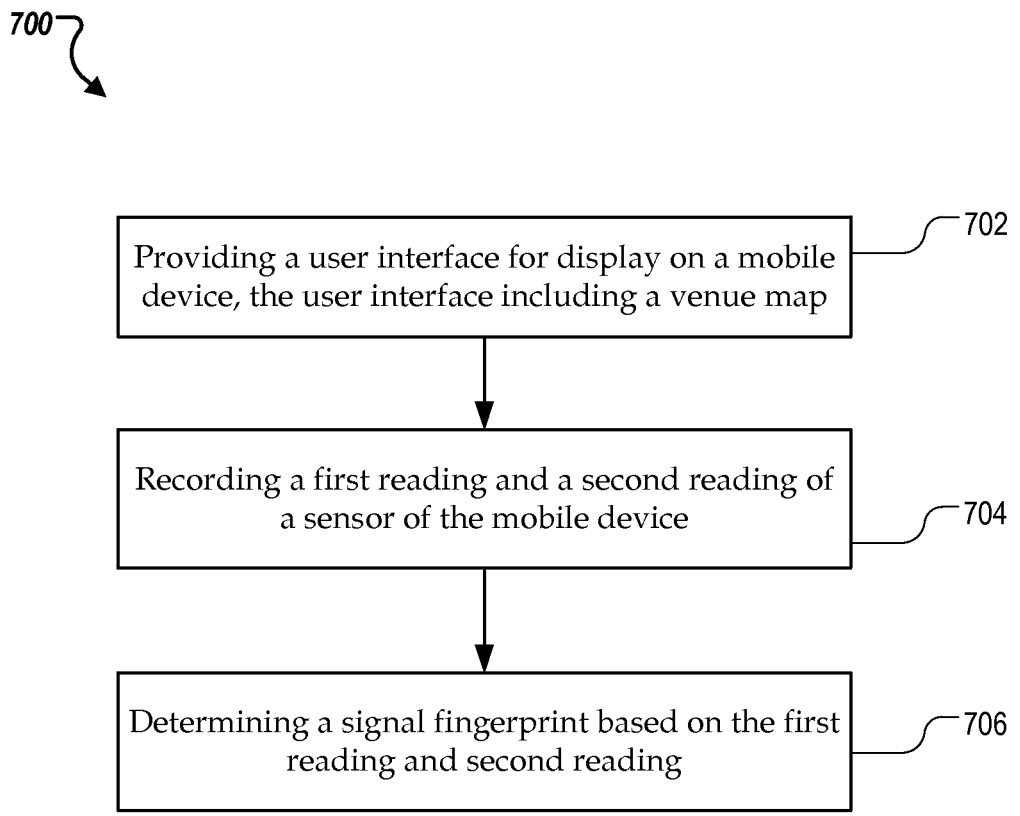
FIG. 7 is a flowchart of an exemplary procedure of still survey.

FIG. 7 is a flowchart of exemplary procedure 700 of still survey. Procedure 700 can be performed by mobile device 102. Mobile device 102 can provide (702) a user interface for display on mobile device 102. The user interface can include a venue map. The venue map can be a map of a venue including a space accessible by a pedestrian and one or more constraints of the pedestrian's movement in the space. The map configured to receive from a user an input placing a marker at a location on the venue map. The location can be a survey location indicating a user-estimated location of mobile device 102 at the venue.

Mobile device 102 can record (704) a first reading of a sensor of mobile device 102 and a second reading of the sensor. The first reading can be associated with a first orientation of at least one of a user (surveyor) or mobile device 102. The second reading can be associated with a second orientation of the user or mobile device 102. The first reading and the second reading of the sensor each can measuring one or more signals received by the sensor at the survey location. The one or more signals each can be an RF signal transmitted from a wireless gateway, e.g., a wireless access point. The sensor can be an RF signal receiver. Recording the readings can include configuring the sensor to scan channels of each wireless access point for at least a threshold time at each orientation. The threshold time can be longer than a beacon interval of the wireless access point. The first orientation can be perpendicular to the second orientation or facing the second orientation.

Mobile device 102, or location server 112, can determine (706) a signal fingerprint of the survey location based on the first reading and the second reading. Determining the signal fingerprint can include controlling (e.g., predicting and reducing fluctuation caused by) an effect of a body of the user body on the signal fingerprint based on a difference between the first reading and second reading and a difference between the first orientation and the second orientation. Determining the signal fingerprint of the location can include determining a probability distribution of an expected reading of a sensor of another mobile device when the other mobile device is located at the location. Determining the signal fingerprint of the location can include determining a variance of the expected reading. A magnitude of the variance can correspond to the difference between the first reading and second reading. For example, a greater difference can correspond to greater variance.

Figure 8:
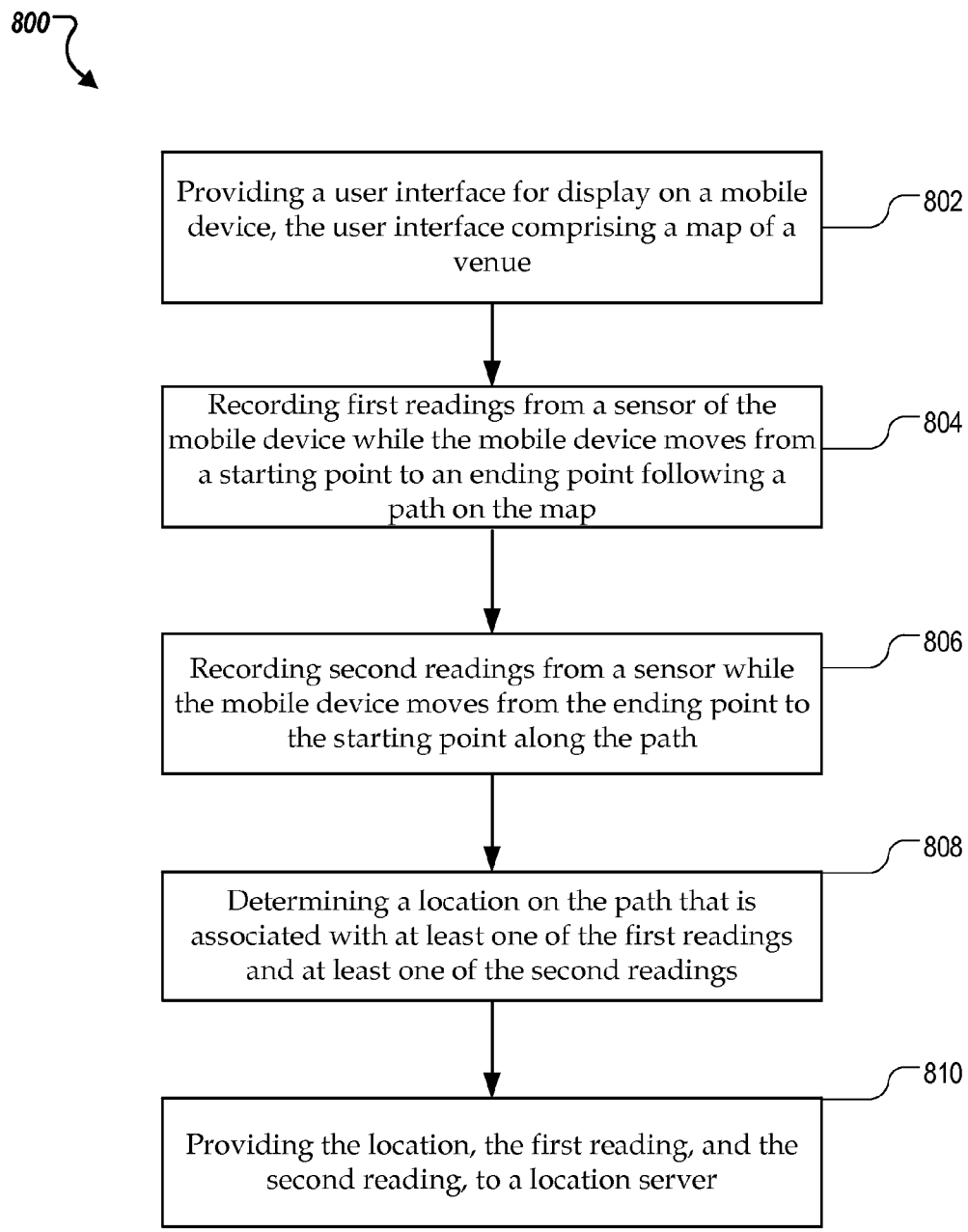
FIG. 8 is a flowchart of an exemplary procedure of walking survey.

FIG. 8 is a flowchart of exemplary procedure 800 of walking survey. Procedure 800 can be performed by mobile device 102.

Mobile device 102 can provide (802) a user interface for display to a user. The user interface can include a map of a venue. The venue can include a space accessible by a pedestrian and one or more constraints of the pedestrian's movement in the space. The map can be configured to receive a first placement input placing an origin marker on the map. The map can be configured to receive a second placement input placing a destination marker on the map. A location of each of the origin marker and the destination marker on the map can respectively indicate a user-estimated starting point and a user-estimated ending point of movement of mobile device 102 at the venue.

Mobile device 102 can record (804) first readings from a sensor of mobile device 102 while mobile device moves from the starting point to the ending point along a path defined by the starting point and the ending point. The readings can include measurements of one or more signals received by the sensor. The one or more signals can be RF signals. Each of the one or more signals can be received from an RF signal transmitter, e.g., a wireless access point.

Mobile device 102 can record (806) second readings from a sensor while the mobile device moves from the ending point to the starting point along the path. Recording the first readings and the second readings can include scanning selected channels of each signal source. Mobile device 102 can select the channels based on whether the channels overlap with other channels. For example, when the signal sources are 802.11 wireless access points, mobile device 102 can select channels that do not overlap each other (e.g., channels 1, 6, and 11). Scanning the selected channels can include scanning each selected channel for a threshold time period (e.g., 110 milliseconds) that is longer than a beacon interval of the wireless access point. Mobile device 102 can maximize a scan rate of the sensor, given the threshold time period.

In some implementations, while scanning a selected channel (e.g., channel 1 of a wireless access point), mobile device 102 can detect a beacon signal on a neighboring channel (e.g., channel 2, which partially overlaps channel 1). Mobile device 102 can record a measurement of the beacon signal as one of the first measurements or one of the second measurements.

Mobile device 102 can determine (808) a location on the path that is associated with at least one of the first readings and at least one of the second readings. Determining the location on the path can include determining a movement velocity of mobile device 102 traveling in both directions, determining a time of first measurement of signals at a given location based on the velocity, and a time of second measurement of signals at the given location, and determining the first reading and the second reading from a series of timed readings based on the respective time.

Mobile device 102 can provide (810) the location, the at least one first reading, and the at least one second reading, to a location server for determining, using interpolation, a signal fingerprint of the location. Determining the signal fingerprint of the location can include controlling an effect of a body of the user on the signal fingerprint based on a difference between the first readings and the second readings. Determining the signal fingerprint of the location can include determining a probability distribution of an expected reading of a sensor of another mobile device at the location and a variance of the expected readings. A magnitude of the variance can correspond to differences between the first readings and second readings. In some implementations, mobile device 102 can determine a length of the path. Based on the length, mobile device 102 can determine whether mobile device 102 moved at a constant speed from the starting point to the ending point and from the ending point to the starting point. If mobile device 102 is determined to have moved at a constant speed, mobile device 102 can cause the variance to be adjusted (e.g., lowered) during the signal fingerprint determination.

In some implementations, stage 802 of providing a user interface for display to a user can be post hoc, e.g., occur after mobile device 102 already recorded readings along a path. Mobile device can determine a survey path based on the locations of the origin marker and the destination marker and the map according to the constraints of movements represented on the map. Determining the path can include determining a speed and a heading of mobile device 102 using a MEMS device of mobile device 102. Mobile device 102 can then determine at least a portion of the path based on the origin marker, the speed and heading, and the constraints of the map.

Figure 9:
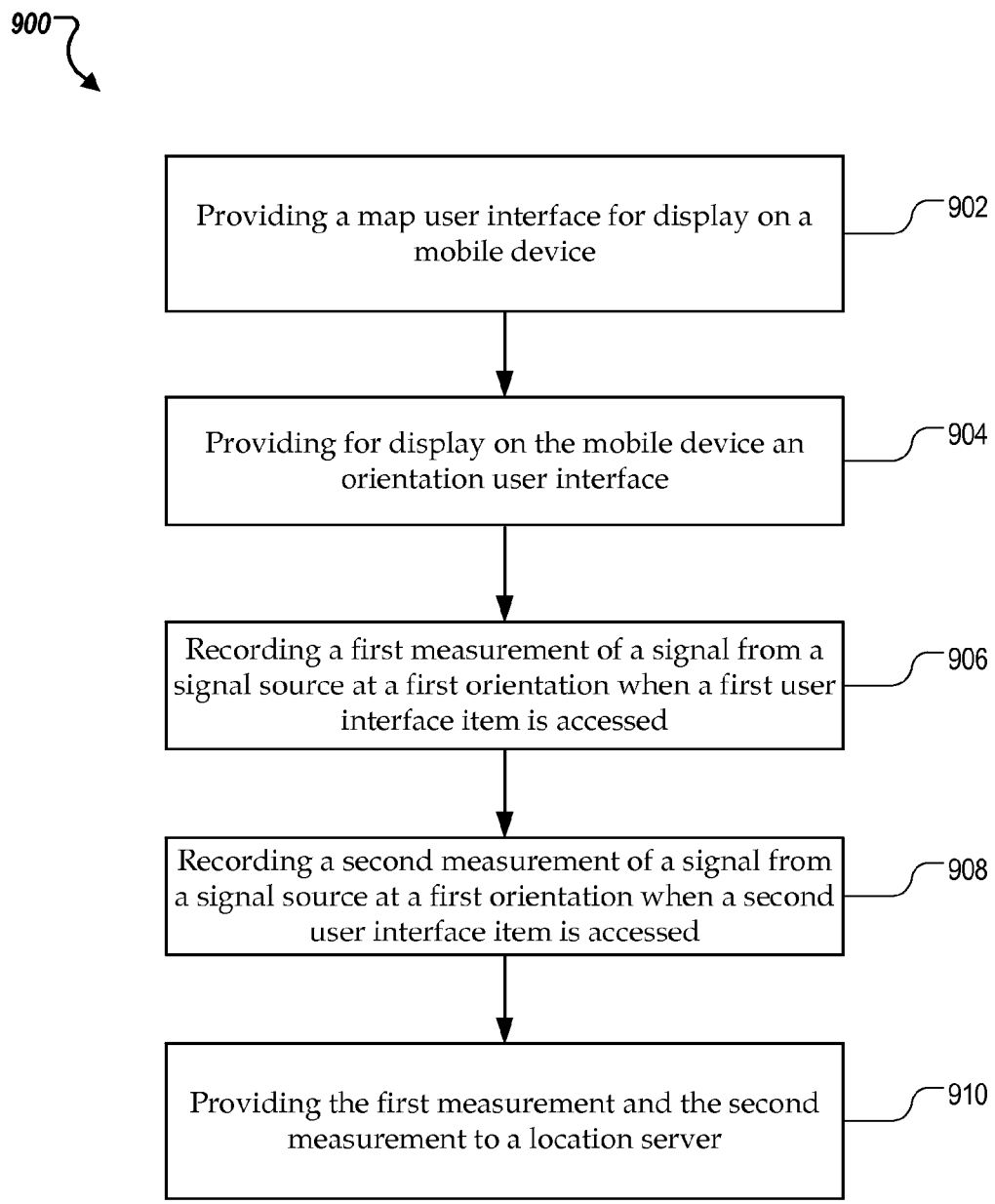
FIG. 9 is a flowchart of an exemplary procedure of still survey utilizing a survey user interface.

FIG. 9 is a flowchart of exemplary procedure 900 of still survey utilizing a survey user interface. The survey user interface can include a map user interface (e.g., venue map 202) and an orientation user interface (e.g., orientation user interface 206).

Mobile device 102 can provide (902) for display the map user interface. The map user interface can include a map of a venue. The map can represent constraints of pedestrian movements at the venue. The map user interface can be configured to receive a location input specifying an estimated location of mobile device 102 at the venue. The location can be absolute (e.g., including latitude, longitude, and altitude coordinates) or relative to the venue (e.g., in a hallway, office, or conference room).

Upon receiving the location input, mobile device 102 can provide (904) for display the orientation user interface. The orientation user interface can include a first orientation user interface item (e.g., a prompt "E" of orientation user interface 206) and a second user interface item (e.g., a prompt "S" of orientation user interface 206.) Each of the first orientation user interface item and second user interface item can indicate a respective orientation of mobile device 102. Each orientation of mobile device 102 can be a direction mobile device 102 faces or a surveyor carrying mobile device 102 faces.

Mobile device 102 can record (906) a first measurement of a signal from a signal source at a first orientation in response to an input received through the first user interface item. The signal source can be an RF signal transmitter, e.g., a wireless access point. Recording the first measurement can include performing a channel scan of RF signals from the wireless access device.

Mobile device 102 can record (908) a second measurement of the signal from the signal source at a second orientation in response to an input received through the second user interface item. The first orientation can be different from the second orientation. For example, the first orientation can be perpendicular to the second orientation or faces the second orientation. Accordingly, positions of the surveyor relative to a line of sight between mobile device 102 and the signal source can be different. For example, in the first orientation, the surveyor can be between mobile device and the signal source, whereas in the second orientation, mobile device 102 can be between the surveyor and the signal source. The surveyor can attenuate the signal. Accordingly, attenuation of the signal caused by the surveyor carrying mobile device 102 in the first orientation can be different from attenuation of the signal caused by the surveyor carrying the device in the second orientation.

Mobile device 102 can provide (910) the first measurement and the second measurement in association with the location to a location server for determining location fingerprint data for the venue. Differences between the first measurement and the second measurement can be used to determine a variance of an expected measurement of signals from the signal source at the location and, through interpolation, expected measurements of signals from the signal source at other locations at the venue.

Exemplary Mobile Device Architecture

Figure 10:
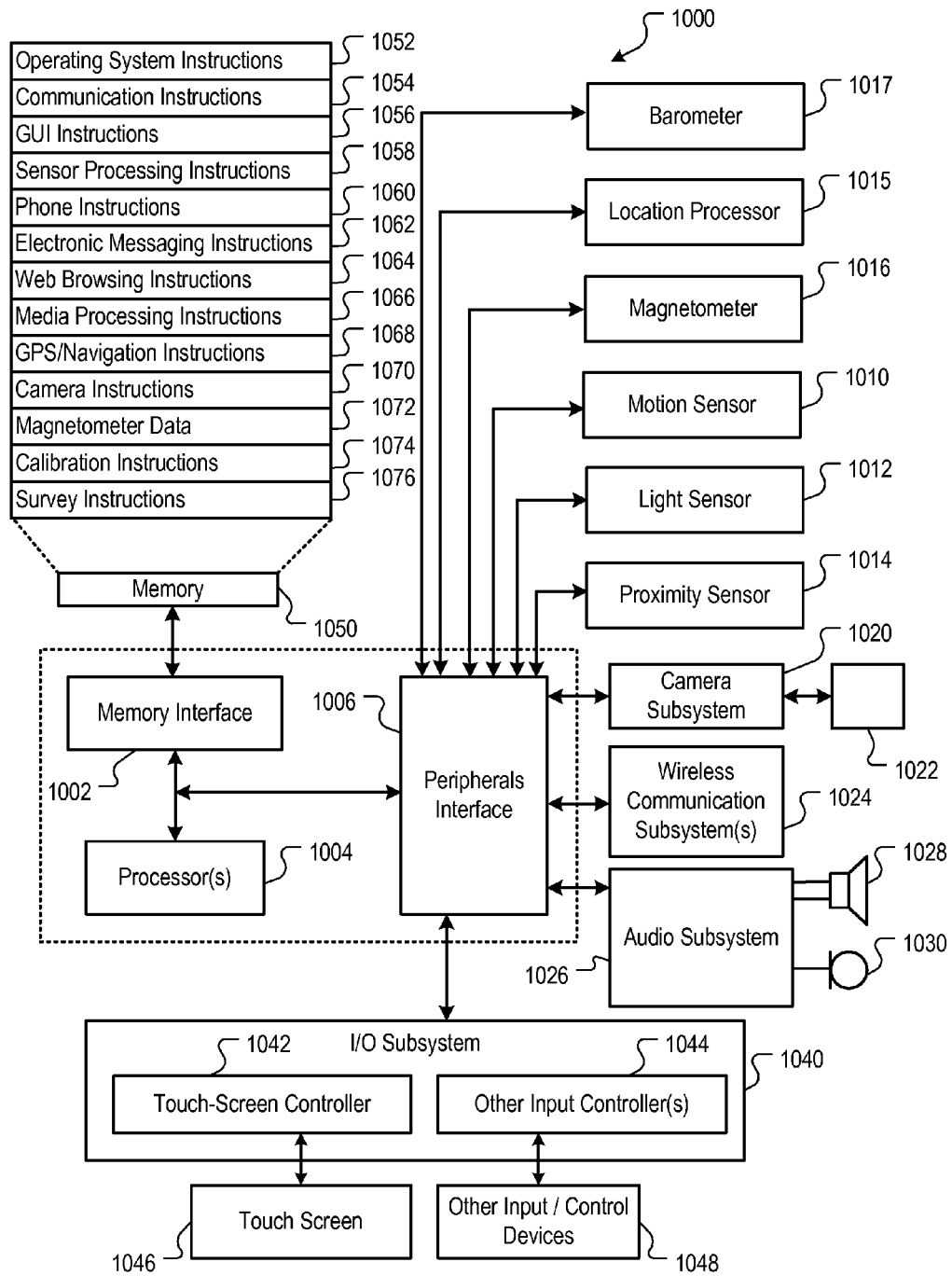
FIG. 10 is a block diagram illustrating an exemplary device architecture of a mobile device implementing the features and operations described in reference to FIGS. 1-9.

FIG. 10 is a block diagram of an exemplary architecture 1000 for the mobile devices of FIGS. 1-9. A mobile device (e.g., mobile device 102) can include memory interface 1002, one or more data processors, image processors and/or processors 1004, and peripherals interface 1006. Memory interface 1002, one or more processors 1004 and/or peripherals interface 1006 can be separate components or can be integrated in one or more integrated circuits. Processors 1004 can include application processors, baseband processors, and wireless processors. The various components in mobile device 102, for example, can be coupled by one or more communication buses or signal lines.

Sensors, devices, and subsystems can be coupled to peripherals interface 1006 to facilitate multiple functionalities. For example, motion sensor 1010, light sensor 1012, and proximity sensor 1014 can be coupled to peripherals interface 1006 to facilitate orientation, lighting, and proximity functions of the mobile device. Location processor 1015 (e.g., GPS receiver) can be connected to peripherals interface 1006 to provide geopositioning. Electronic magnetometer 1016 (e.g., an integrated circuit chip) can also be connected to peripherals interface 1006 to provide data that can be used to determine the direction of magnetic North. Thus, electronic magnetometer 1016 can be used as an electronic compass. Motion sensor 1010 can include one or more accelerometers configured to determine change of speed and direction of movement of the mobile device. Barometer 1017 can include one or more devices connected to peripherals interface 1006 and configured to measure pressure of atmosphere around the mobile device.

Camera subsystem 1020 and an optical sensor 1022, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 1024, which can include radio frequency receivers and transmitters and/or optical (e.g., infrared) receivers and transmitters. The specific design and implementation of the communication subsystem 1024 can depend on the communication network(s) over which a mobile device is intended to operate. For example, a mobile device can include communication subsystems 1024 designed to operate over a GSM network, a GPRS network, an EDGE network, a Wi-Fi™ or WiMax™ network, and a Bluetooth™ network. In particular, the wireless communication subsystems 1024 can include hosting protocols such that the mobile device can be configured as a base station for other wireless devices.

Audio subsystem 1026 can be coupled to a speaker 1028 and a microphone 1030 to facilitate voice-enabled functions, such as voice recognition, voice replication, digital recording, and telephony functions. Audio subsystem 1026 can be configured to receive voice commands from the user.

I/O subsystem 1040 can include touch surface controller 1042 and/or other input controller(s) 1044. Touch surface controller 1042 can be coupled to a touch surface 1046 or pad. Touch surface 1046 and touch surface controller 1042 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch surface 1046. Touch surface 1046 can include, for example, a touch screen.

Other input controller(s) 1044 can be coupled to other input/control devices 1048, such as one or more buttons, rocker switches, thumb-wheel, infrared port, USB port, and/or a pointer device such as a stylus. The one or more buttons (not shown) can include an up/down button for volume control of speaker 1028 and/or microphone 1030.

In one implementation, a pressing of the button for a first duration may disengage a lock of the touch surface 1046; and a pressing of the button for a second duration that is longer than the first duration may turn power to mobile device 102 on or off. The user may be able to customize a functionality of one or more of the buttons. The touch surface 1046 can, for example, also be used to implement virtual or soft buttons and/or a keyboard.

In some implementations, mobile device 102 can present recorded audio and/or video files, such as MP3, AAC, and MPEG files. In some implementations, mobile device 102 can include the functionality of an MP3 player. Mobile device 102 may, therefore, include a pin connector that is compatible with the iPod. Other input/output and control devices can also be used.

Memory interface 1002 can be coupled to memory 1050. Memory 1050 can include high-speed random access memory and/or non-volatile memory, such as one or more magnetic disk storage devices, one or more optical storage devices, and/or flash memory (e.g., NAND, NOR). Memory 1050 can store operating system 1052, such as Darwin, RTXC, LINUX, UNIX, OS X, WINDOWS, or an embedded operating system such as VxWorks. Operating system 1052 may include instructions for handling basic system services and for performing hardware dependent tasks. In some implementations, operating system 1052 can include a kernel (e.g., UNIX kernel).

Memory 1050 may also store communication instructions 1054 to facilitate communicating with one or more additional devices, one or more computers and/or one or more servers. Memory 1050 may include graphical user interface instructions 1056 to facilitate graphic user interface processing; sensor processing instructions 1058 to facilitate sensor-related processing and functions; phone instructions 1060 to facilitate phone-related processes and functions; electronic messaging instructions 1062 to facilitate electronic-messaging related processes and functions; web browsing instructions 1064 to facilitate web browsing-related processes and functions; media processing instructions 1066 to facilitate media processing-related processes and functions; GPS/Navigation instructions 1068 to facilitate GPS and navigation-related processes and instructions; camera instructions 1070 to facilitate camera-related processes and functions; magnetometer data 1072 and calibration instructions 1074 to facilitate magnetometer calibration. The memory 1050 may also store other software instructions (not shown), such as security instructions, web video instructions to facilitate web video-related processes and functions, and/or web shopping instructions to facilitate web shopping-related processes and functions. In some implementations, the media processing instructions 1066 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 1050. Memory 1050 can store state instructions 1076 that, when executed, can cause processor 1004 to perform operations of survey subsystem 500 as described above in reference to FIG. 5, including operations of still survey and walking survey.

Each of the above identified instructions and applications can correspond to a set of instructions for performing one or more functions described above. These instructions need not be implemented as separate software programs, procedures, or modules. Memory 1050 can include additional instructions or fewer instructions. Furthermore, various functions of the mobile device may be implemented in hardware and/or in software, including in one or more signal processing and/or application specific integrated circuits.

Exemplary Operating Environment

Figure 11:
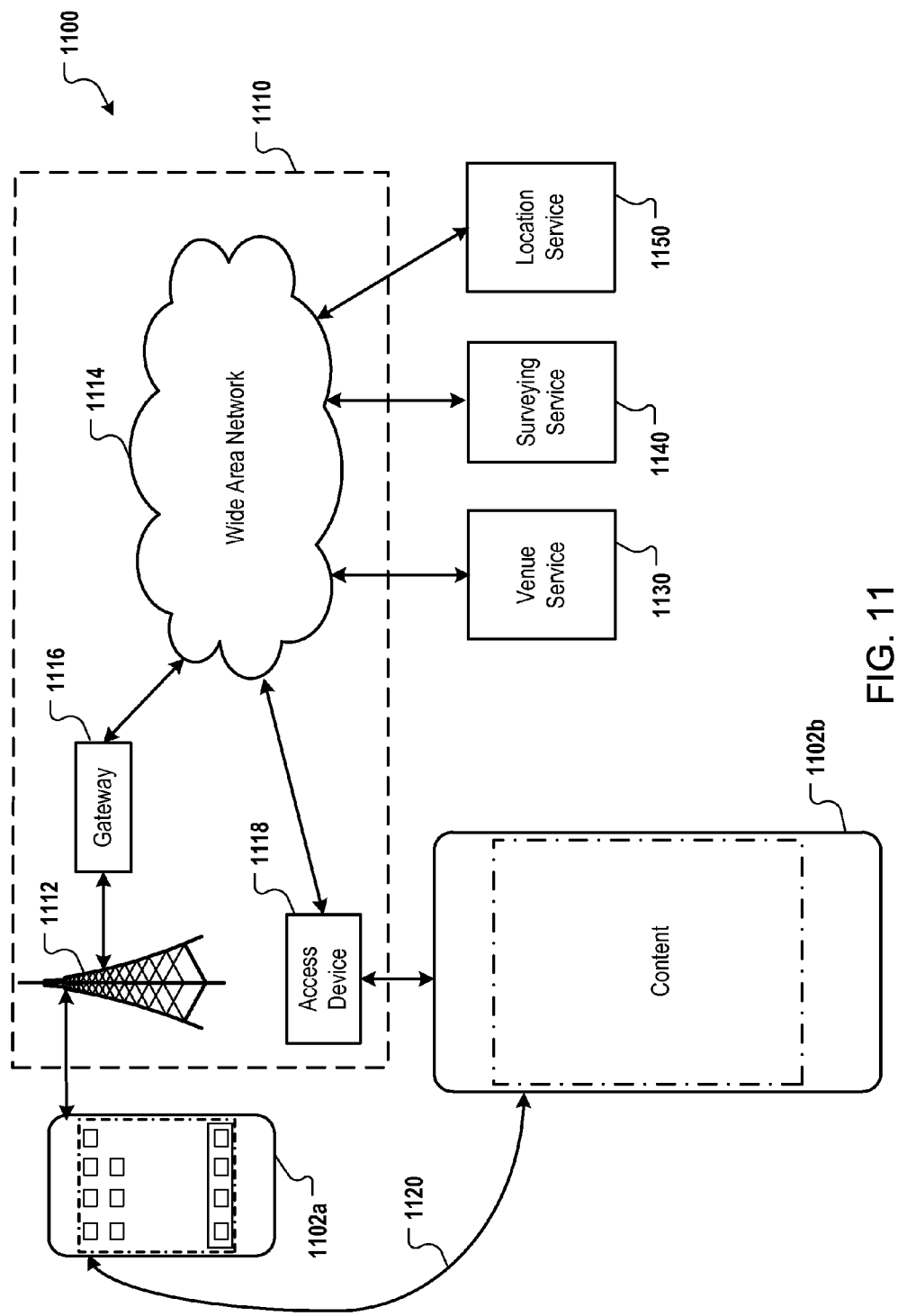
FIG. 11 is a block diagram of an exemplary network operating environment for the mobile devices of FIGS. 1-9.

FIG. 11 is a block diagram of an exemplary network operating environment 1100 for the mobile devices of FIGS. 1-9. Mobile devices 1102a and 1102b can, for example, communicate over one or more wired and/or wireless networks 1110 in data communication. For example, a wireless network 1112, e.g., a cellular network, can communicate with a wide area network (WAN) 1114, such as the Internet, by use of a gateway 1116. Likewise, an access device 1118, such as an 802.11g wireless access point, can provide communication access to the wide area network 1114. Each of mobile devices 1102a and 1102b can be mobile device 102 configured to survey a venue, or another mobile device requesting location services.

In some implementations, both voice and data communications can be established over wireless network 1112 and the access device 1118. For example, mobile device 1102a can place and receive phone calls (e.g., using voice over Internet Protocol (VoIP) protocols), send and receive e-mail messages (e.g., using Post Office Protocol 3 (POP3)), and retrieve electronic documents and/or streams, such as web pages, photographs, and videos, over wireless network 1112, gateway 1116, and wide area network 1114 (e.g., using Transmission Control Protocol/Internet Protocol (TCP/IP) or User Datagram Protocol (UDP)). Likewise, in some implementations, the mobile device 1102b can place and receive phone calls, send and receive e-mail messages, and retrieve electronic documents over the access device 1118 and the wide area network 1114. In some implementations, mobile device 1102a or 1102b can be physically connected to the access device 1118 using one or more cables and the access device 1118 can be a personal computer. In this configuration, mobile device 1102a or 1102b can be referred to as a "tethered" device.

Mobile devices 1102a and 1102b can also establish communications by other means. For example, wireless device 1102a can communicate with other wireless devices, e.g., other mobile devices, cell phones, etc., over the wireless network 1112. Likewise, mobile devices 1102a and 1102b can establish peer-to-peer communications 1120, e.g., a personal area network, by use of one or more communication subsystems, such as the Bluetooth™ communication devices. Other communication protocols and topologies can also be implemented.

The mobile device 1102a or 1102b can, for example, communicate with one or more services 1130, 1140, and 1150 over the one or more wired and/or wireless networks. For example, one or more venue services 1130 can provide venue information to mobile devices 1102a and 1102b. The venue information can include venue identifiers associated with venue maps. Survey service 1140 can receive survey data from mobile devices 1102a and 1102b, and generating location fingerprint data for venues based on the survey data. Location service 1150 can provide the location fingerprint data to mobile devices 1102a and 1102b for determining locations at each venue.

Mobile device 1102a or 1102b can also access other data and content over the one or more wired and/or wireless networks. For example, content publishers, such as news sites, Really Simple Syndication (RSS) feeds, web sites, blogs, social networking sites, developer networks, etc., can be accessed by mobile device 1102a or 1102b. Such access can be provided by invocation of a web browsing function or application (e.g., a browser) in response to a user touching, for example, a Web object.

A number of implementations of the invention have been described. Nevertheless, it will be understood that various modifications can be made without departing from the spirit and scope of the invention.

What is claimed is:

1. A method, comprising:
   providing a user interface for display on a mobile device, the user interface comprising a map of a venue, the venue comprising a space accessible by a pedestrian and one or more constraints of movement of the pedestrian in the space, the map configured to receive a first placement input placing an origin marker on the map and to receive a second placement input placing a
destination marker on the map, wherein a location of
each of the origin marker and the destination marker on
the map respectively indicates a user-estimated starting
point and a user-estimated ending point of movement
of the mobile device at the venue;

recording first measurements from a sensor of the mobile
device while the mobile device moves from the starting
point to the ending point along a path defined by the
starting point and the ending point, the first measurements comprising measurements of one or more signals
received by the sensor;

recording second measurements from a sensor while the
mobile device moves from the ending point to the
starting point along the path;

determining a location on the path that is associated with
at least one of the first measurements and at least one
of the second measurements; and providing the location, the at least one first measurements,
and the at least one second measurements, to a location
server for determining, using interpolation, a signal
fingerprint of the location.

2. The method of claim 1, wherein the one or more signals comprise a radio frequency (RF) signal.

3. The method of claim 2, wherein:
each of the one or more signals is from a wireless access point, and
recording the first measurements and the second measurements comprises scanning selected channels of each wireless access point, the channels being selected based on whether the channels overlap with other channels.

4. The method of claim 3, comprising:
while scanning a selected channel, detecting a beacon signal on a neighboring channel; and
recording a measurement of the beacon signal as one of the first measurements or one of the second measurements.

5. The method of claim 3, comprising maximizing scan rate for the sensor.

6. The method of claim 2, wherein determining the signal fingerprint of the location comprises controlling an effect of a body of the user on the signal fingerprint based on a difference between the first measurements and the second measurements.

7. The method of claim 6, wherein determining the signal fingerprint of the location comprises determining a probability distribution of an expected reading of a sensor of another mobile device at the location and a variance of the expected readings, wherein a magnitude of the variance corresponds to differences between the first measurements and second measurements.

8. The method of claim 6, wherein providing the user interface for display occurs after recording the first measurements and second measurements.

9. The method of claim 8, comprising determining the path based on the locations of the origin marker and the destination marker and the map according to the constraints of movements represented on the map.

10. The method of claim 9, wherein determining the path comprises:
determining a speed and a heading of the mobile device using a micro-electro-mechanical systems (MEMS) device of the mobile device; and
determining at least a portion of the path based on the origin marker, the speed and heading, and the constraints of the map.

11. The method of claim 6, comprising:
determining a length of the path;
based on the length, determining whether the mobile device moved at a constant speed from the starting point to the ending point and from the ending point to the starting point; and
adjusting a variance in the signal fingerprint based on the determining.

12. A non-transitory storage device storing computer instructions operable to cause one or more processors to perform operations comprising:
providing a user interface for display on a mobile device, the user interface comprising a map of a venue, the venue comprising a space accessible by a pedestrian and one or more constraints of movement of the pedestrian in the space, the map configured to receive a first placement input placing an origin marker on the map and to receive a second placement input placing a destination marker on the map, wherein a location of each of the origin marker and the destination marker on the map respectively indicates a user-estimated starting point and a user-estimated ending point of movement of the mobile device at the venue;

recording first measurements from a sensor of the mobile device while the mobile device moves from the starting point to the ending point along a path defined by the starting point and the ending point, the first measurements comprising measurements of one or more signals received by the sensor;

recording second measurements from a sensor while the mobile device moves from the ending point to the starting point along the path;

determining a location on the path that is associated with at least one of the first measurements and at least one of the second measurements; and providing the location, the at least one first measurements, and the at least one second measurements, to a location server for determining, using interpolation, a signal fingerprint of the location.

13. The storage device of claim 12, the operations comprising:
while scanning a selected channel, detecting a beacon signal on a neighboring channel; and
recording a measurement of the beacon signal as one of the first measurements or one of the second measurements.

14. The storage device of claim 12, the operations comprising maximizing scan rate for the sensor.

15. A system comprising:
one or more processors; and
a non-transitory storage device storing computer instructions operable to cause the one or more processors to perform operations comprising:
providing a user interface for display on a mobile device, the user interface comprising a map of a venue, the venue comprising a space accessible by a pedestrian and one or more constraints of movement of the pedestrian in the space, the map configured to receive a first placement input placing an origin marker on the map and to receive a second placement input placing a destination marker on the map, wherein a location of each of the origin marker and the destination marker on the map respectively indicates a user-estimated starting point and a user-estimated ending point of movement of the mobile device at the venue;

recording first measurements from a sensor of the mobile device while the mobile device moves from the starting point to the ending point along a path defined by the starting point and the ending point, the first measurements comprising measurements of one or more signals received by the sensor;

recording second measurements from a sensor while the mobile device moves from the ending point to the starting point along the path;

determining a location on the path that is associated with at least one of the first measurements and at least one of the second measurements; and providing the location, the at least one first measurements, and the at least one second measurements, to a location server for determining, using interpolation, a signal fingerprint of the location.

16. The system of claim 15, the operations comprising:
while scanning a selected channel, detecting a beacon signal on a neighboring channel; and recording a measurement of the beacon signal as one of the first measurements or one of the second measurements.

17. The system of claim 15, the operations comprising maximizing scan rate for the sensor.

18. The system of claim 15, wherein providing the user interface for display occurs after recording the first measurements and second measurements, the operations comprising determining the path based on the locations of the origin marker and the destination marker and the map according to the constraints of movements represented on the map.

19. The system of claim 18, wherein determining the path comprises:

determining a speed and a heading of the mobile device using a micro-electro-mechanical systems (MEMS) device of the mobile device; and determining at least a portion of the path based on the origin marker, the speed and heading, and the constraints of the map.

20. The system of claim 19, the operations comprising:
determining a length of the path;

based on the length, determining whether the mobile device moved at a constant speed from the starting point to the ending point and from the ending point to the starting point; and adjusting a variance in the signal fingerprint based on the determining.

* * * * *